(12) United States Patent
Hosseinbor et al.

(10) Patent No.: US 10,984,085 B2
(45) Date of Patent: Apr. 20, 2021

(54) BIOMETRIC RECOGNITION FOR UNCONTROLLED ACQUISITION ENVIRONMENTS

(71) Applicant: Bio-key International, Inc., Wilmington, DE (US)

(72) Inventors: Ameer Pasha Hosseinbor, Minneapolis, MN (US); Renat Zufarovych Zhdanov, Eagan, MN (US); Alexander Ouchveridze, Plymouth, MN (US)

(73) Assignee: BIO-KEY INTERNATIONAL, INC., Eagan, MN (US)

( * ) Notice: Subject to any disclaimer, the term of this patent is extended or adjusted under 35 U.S.C. 154(b) by 222 days.

(21) Appl. No.: 16/054,476

(22) Filed: Aug. 3, 2018

(65) Prior Publication Data

US 2019/0080068 A1 Mar. 14, 2019

Related U.S. Application Data

(60) Provisional application No. 62/540,765, filed on Aug. 3, 2017.

(51) Int. Cl.
*G06F 21/32* (2013.01)
*G06K 9/62* (2006.01)
*G06K 9/00* (2006.01)

(52) U.S. Cl.
CPC ........... *G06F 21/32* (2013.01); *G06K 9/0002* (2013.01); *G06K 9/6203* (2013.01); *G06K 9/6215* (2013.01)

(58) Field of Classification Search
CPC .. G06K 9/6215; G06K 9/6203; G06K 9/0002; G06F 21/32
See application file for complete search history.

(56) References Cited

U.S. PATENT DOCUMENTS

| 8,411,913 | B2 * | 4/2013 | Zhang | G06K 9/00073 382/125 |
| 9,471,827 | B2 * | 10/2016 | Thiebot | G06K 9/0008 |
| 9,785,819 | B1 * | 10/2017 | Oreifej | G06T 7/37 |
| 10,339,362 | B2 * | 7/2019 | Othman | G06F 21/32 |

* cited by examiner

*Primary Examiner* — Jung W Kim
*Assistant Examiner* — Timothy P Hallman
(74) *Attorney, Agent, or Firm* — Wesley Malherek; Kelly, Holt & Christenson, PLLC

(57) ABSTRACT

A computer-implemented method of registering image data in the context of a biometric security system includes receiving an indication of image data, detecting a first point set and a second point set, based on the image data, and generating a metric of closeness between the first point set and the second point set. In addition, the computer-implemented method includes applying the metric of closeness to a transformation model to obtain a transformation parameter and transforming the first point set with respect to the second point set, based on the transformation parameter. Further, the computer-implemented method includes determining whether transformation of the first point set with respect to the second point set indicates convergence and, if so, generating an output indicative of an aligned point set.

16 Claims, 4 Drawing Sheets

BIOMETRIC RECOGNITION FOR UNCONTROLLED ACQUISITION ENVIRONMENTS

CROSS REFERENCE TO RELATED APPLICATION

The present application is based on and claims the benefit of U.S. provisional patent application Ser. No. 62/540,765, filed Aug. 3, 2017, the content of which is hereby incorporated by reference in its entirety.

BACKGROUND

The present description generally relates to biometric security systems. More specifically, the present description relates to biometric security systems that defend against fraudulent attempts at accessing a secure system.

Biometrics includes information about physical or behavioral characteristics ubiquitous in nature. Physical and behavioral characteristics such as a user's voice, face, iris, DNA, fingerprints, palmprints, vein patterns, and gait can be examined to distinguish one identity to another, or to identity a matching identity.

It is to be appreciated that applications using biometric information should emphasize the importance of accuracy. If a user's identity is mistakenly identified due to inaccuracies that arise when comparing characteristics, secure information can be vulnerable to attack. One way to improve accuracy is by increasing the amount of information that can be used to identify a user. For instance, using a high-resolution camera allows for a more fine-tuned analysis of the characteristics identified from the image. However, using more detailed information is not necessarily a cost effective solution, nor is it a solution that is easily accessible to many users. This is partly due to the fact that biometrics are increasingly used for security purposes across a wide variety of different devices. These devices often vary by their hardware capabilities, meaning that accuracy of results can be limited by the quality of information capable of being extracted by a given device. It is generally difficult to draw accurate conclusions about biometric information when the underlying data is uncontrolled or otherwise varies in quality, particularly when that quality is dependent on the source of the underlying data. Thus, security systems would benefit from the ability to rely on raw, uncontrolled data from various different sources to process accurate conclusions about biometrics.

This would require that systems be upgraded with improved hardware. For instance, one solution might be to use a high-resolution camera to capture detailed images. Detailed images provide a large set of data points, and more clarity when there is a 'dirty' sample, for a more robust analysis when comparing samples. However, this is not a cost-effective solution due to increased costs of the hardware as well as the processing power. In addition, the use of biometric applications is increasingly popular in the mobile device market. Devices used across many personal and commercial networks operate in relatively uncontrolled environments. Despite this, they continue to rely on biometrics for security purposes. There is generally a need to improve the efficiency of security systems, and particularly those making conclusions about identity with uncontrolled data.

The discussion above is merely provided for general background information and is not intended to be used as an aid in determining the scope of the claimed subject matter.

SUMMARY

A computer-implemented method of registering image data in the context of a biometric security system includes receiving an indication of image data, detecting a first point set and a second point set, based on the image data, and generating a metric of closeness between the first point set and the second point set. In addition, the computer-implemented method includes applying the metric of closeness to a transformation model to obtain a transformation parameter and transforming the first point set with respect to the second point set, based on the transformation parameter. Further, the computer-implemented method includes determining whether transformation of the first point set with respect to the second point set indicates convergence and, if so, generating an output indicative of an aligned point set.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description relates to systems and methods for improving image registration and enhancing accuracy when identifying matching features across different images. The concepts described herein can be applied within a wide variety of different imaging systems including, but not limited to, graphic imaging systems, text images, facial imaging systems, retinal imaging systems, and fingerprint imaging systems. The present description provides systems and methods that are particularly useful for matching fingerprint features across images of different formats. While the remainder of the detailed description will primarily focus on examples pertaining to fingerprint image identification, it is to be understood that the concepts described herein can easily be applied within a wide variety of other image identification contexts.

Figure 1:
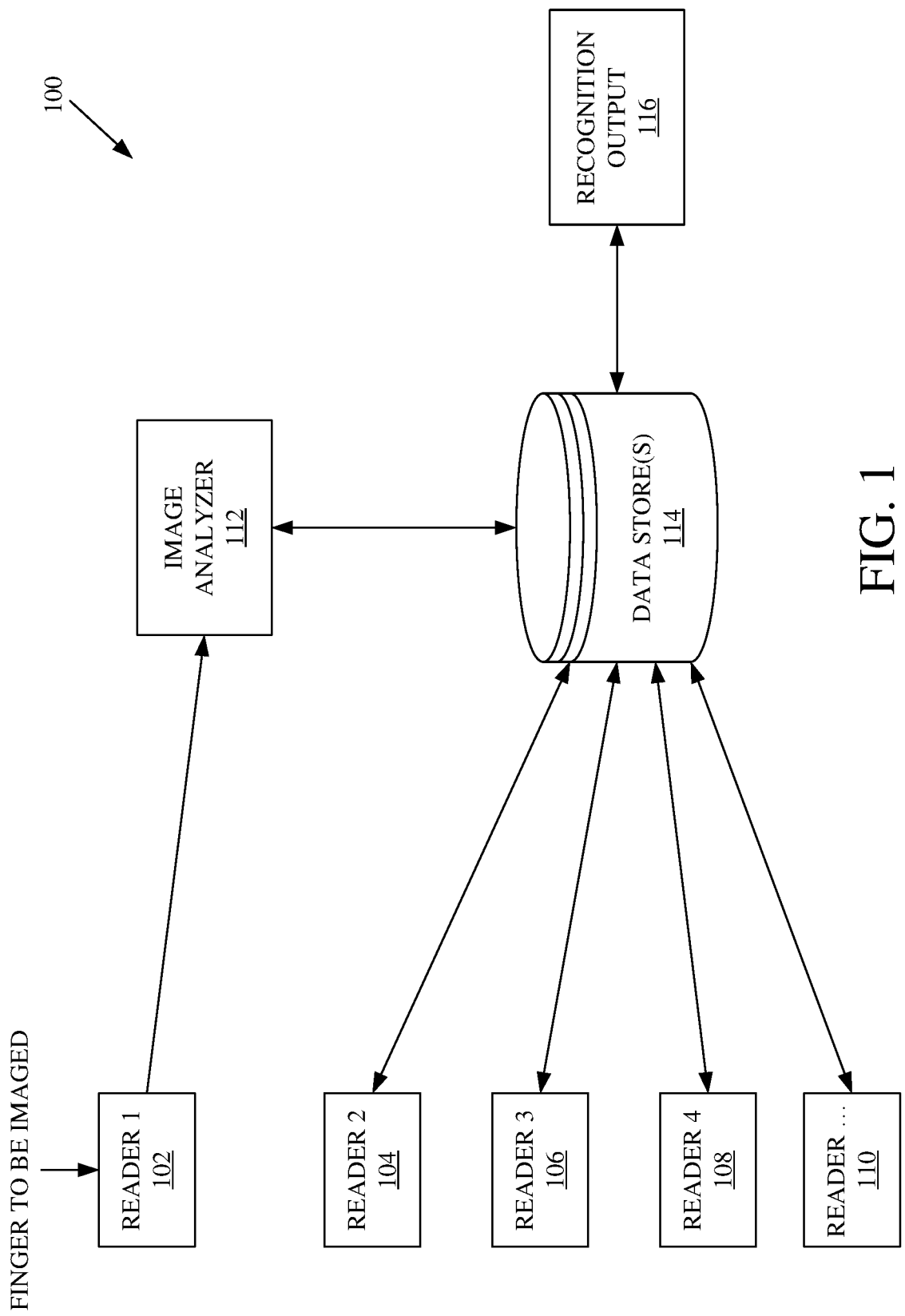
FIG. 1 is a block diagram of one example of a fingerprint imaging system.

FIG. 1 is a block diagram of a fingerprint imaging system 100 in accordance with one embodiment of the present description. Imaging system 100 includes a plurality of different readers 102-110, image analyzer 112, and one or more data store(s) 114. Readers 102-110 can be a wide variety of different systems capable of scanning an image of a fingerprint and transferring data pertaining to the image to an image analyzer, such as image analyzer 112.

In some cases, readers 102-110 will include an optical device that includes a reflecting face designed to receive the finger to be imaged. Light is input into the optical device by a light emitter and an optical image of the finger is reflected out of the optical device to an imager which receives the image and produces an analog image signal indicative of the optical signal received. In many systems, the analog signal is then transferred to a conventional analog/digital converter, which produces a digital representation of the analog signal. The digital signal is reformatted into a digitized image which can be stored and, in accordance with an embodiment of the present invention, manipulated. Finally, the digitized image is transferred out of the readers to an image analyzer 112. As discussed in further detail below, readers 102-110 can also include cameras or other imaging hardware, such as a camera within a mobile device. It is noted that readers 102-110 can also include an ultrasonic imaging device, a capacitive imaging device and a thermal imaging device.

Image analyzer 112 generally analyzes the image data received for a wide variety of purposes and applications. As will be discussed in more detail below, one example image analyzer 112 creates an image model based on the particular features of each image received from readers 102-110. These image models are more than facsimiles of their associated fingerprint images and include a unique range of data elements that provide analytical opportunities that are a part of the present invention.

Image analyzer 112 compares data elements of one image model to data elements of at least one other image model stored within data store(s) 114. The image models contained in data store(s) 114 correspond to previously obtained scanned images, while the image model being compared typically corresponds to a contemporaneously scanned image. Fingerprint imaging system 100, through the incorporation of this process, is able to quickly and efficiently make a determination as to whether the image model corresponding to the contemporaneously scanned fingerprint is substantially similar to any of the image models included within data store(s) 114. As will be discussed in further detail below, fingerprint imaging system 100 requires a particular level of similarity for a match to be indicated. For example, the level of required similarity is adjustable and can be tuned based on the nature of the environment for which system 100 is designed to provide security. In this manner, fingerprint imaging system 100 provides an efficient and accurate fingerprint image identification system that can be used, for instance, as a security measure to determine whether the person who places a finger on reader 102 should be authorized to enter a room, to access a bank account or to take any other variety of actions in the context of a biometric security system.

As is shown in FIG. 1, data store(s) 114 illustratively includes a recognition output 116. The precise nature of recognition output 116 depends on the context within which fingerprint imaging system 100 is to be applied. For example, recognition output 116 includes an indicator of an image contained in data store(s) 114 that substantially matches the image scanned by reader 102. In another example, recognition output 116 includes an indicator of an image contained in data store(s) 114 that has been aligned via iterative transformations with respect to the image scanned by reader 102. This is but one example of the many potential forms of recognition output 116.

Fingerprint imaging system 100 can be used within the context of a biometric security system that regulates user access to devices such as smartphones and laptop computers, facilities, computing system applications, automotive vehicles, automated tellers, kiosks, home security systems, and a wide variety of other secure systems. In one example of fingerprint imaging system 100, readers 102-110 each represent a different type of imaging device, such as an optical imaging device of a mobile device (e.g., smartphone camera). Smartphones and other mobile devices often include cameras and other imaging hardware that are increasingly accessible in the environment. With a large reach to users, these devices can enable users to easily scan or capture an image of the user's finger. While users might benefit from the ability to securely access information by scanning the user's fingerprint with any of these devices, these devices often use different cameras and imaging hardware. For example, users might switch between devices often or only have access to a particular one of the devices at any given time when requesting access to secure information. In the example noted above, for instance, reader 102 includes a camera that is capable of acquiring high resolution images while reader 104 includes a less sophisticated camera that is capable of acquiring lower resolution images. Resolution within the context of a fingerprint image generally refers to a function of the distance between the finger and the camera. Higher resolution images provide detailed image data that is better suited for accurate detection of fingerprint features which, as discussed in further detail below, are often small, complex patterns.

The nature of human fingerprints exacerbates these and other difficulties experienced by some typical systems. Human fingerprints are small, detailed, difficult to alter, and unique to each person. Fingerprints have a wide variety of different identifiable features that can be categorized as a type of ridge or ridge pattern. For example, a "ridge ending" is characterized by a single ridge that abruptly ends, a "ridge bifurcation" is characterized by a single ridge that splits into two separate ridges, and a "ridge enclosure" is characterized by a single ridge that bifurcates and, shortly thereafter, reunites as a single ridge. These and other types of fingerprint features can be extracted by image analyzer 112 and for comparison to fingerprint features extracted from another image. When raw images are unlabeled or have different resolutions the features extracted from one fingerprint image might not align with the features extracted from another fingerprint image even though those two images show the same fingerprint. This misalignment might also be caused by differences in rotation or placement of a user's finger during sampling.

As discussed in further detail below, the present description provides a fingerprint imaging system that improves fingerprint image registration for images of different and/or unknown resolutions. The features described below allow for a direct comparison between the features of one fingerprint image to the features of another fingerprint image by estimating a scale between the two images. For instance, an improved image analyzer registers features of one image to features of another image by iteratively refining a transformation parameter that transforms an image, according to weighted measures of closeness, in order to align the images for determining whether the two images show a fingerprint that belongs to the same person (e.g., to detect a matching fingerprint image). More specifically, for example, the features described herein improve the ability of fingerprint imaging system 100 to acquire touchless fingerprint images from multiple different readers 102-110, thereby allowing a user to verify identity by using any of the devices, regardless of a given device's capabilities in providing quality (high resolution) data. The present features also provide the ability to identify fingerprint features from unknown or unlabeled image data, such as an image captured with an unknown resolution. Rescaling one image to another is not readily available when resolutions are unknown. Thus, the present features address difficulties that some typical systems might experience when attempting to compare images obtained from uncontrolled acquisition environments, especially when the images are of different and/or unknown resolutions and depict small, complex features of a user's fingerprint patterns.

Figure 2:
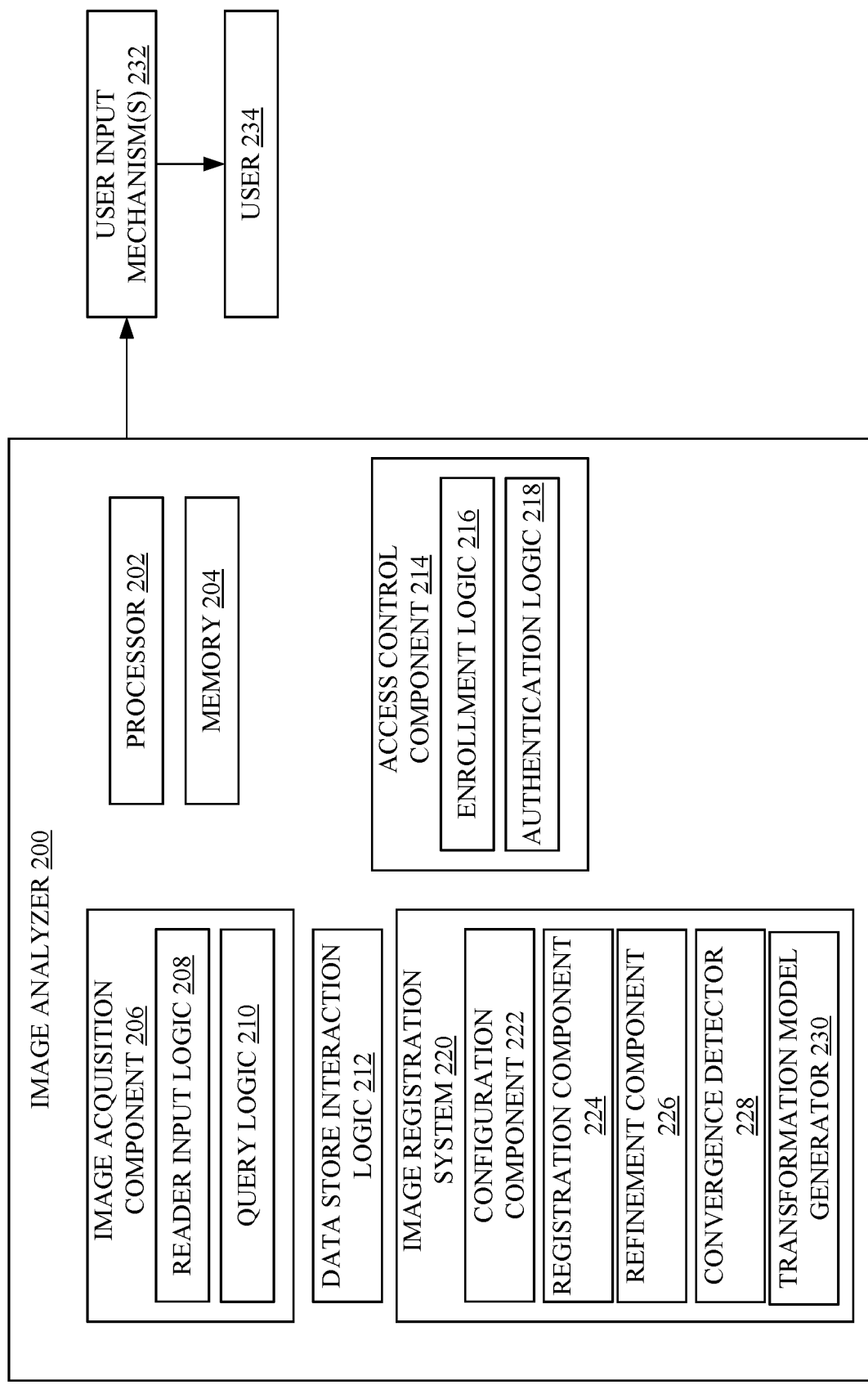
FIG. 2 is a block diagram of one example of an image analyzer including an image registration system.

FIG. 2 is a block diagram of one example of an image analyzer 200 including an image registration system 220. Prior to discussing image registration system 220 in detail, the following description will provide a brief overview of image analyzer 200. Image analyzer 200 illustratively includes a processor 202, memory 204, image acquisition component 206 including reader input logic 208 and query logic 210, data store interaction logic 212, and access control component 214 including enrollment logic 216 and authentication logic 218. It is noted that image analyzer 200 can include any or all features of image analyzer 112 described with respect to FIG. 1.

Memory 204 can include all types of tangible volatile and non-volatile computer-readable memory devices. It can also include computer storage media. Memory 204 stores computer readable instructions that, when executed by processor 202, cause processor 202 to perform computer-implemented steps or functions according to the instructions. Processor 202 can be activated by other components to facilitate their functionality as well.

Image acquisition component 206 is generally configured to acquire one or more fingerprint images, scans, or sensor information indicative of a user's fingerprint. Reader input logic 208 is configured to obtain an indication of an image captured by reader 102 (among a wide variety of other readers 104-110). For example, reader input logic 208 generates a request for a sample image and receives a digitized image from reader 102 in response to the request. Query logic 210 is configured to generate a query request for a template image, such as a previously generated (sampled) image stored in data store(s) 114, and receive an indication of the image in response to the query request. The query can be generated in response to a user input by user 234, for example via actuation of user input mechanisms 232. The query can also be generated automatically or semi-automatically. For example, in response to receiving an indication of a sample fingerprint image, query logic 210 automatically generates a query that requests a similar, previously sampled image stored within data store(s) 114. In one example, query logic 210 interfaces with data store interaction logic 212 to facilitate obtaining a response to the query request data store(s) 114. Data store interaction logic 212 defines processes for obtaining a wide variety of different information from data store(s) 114.

Access control component 214 is generally configured to regulate user access within the context of a biometric security system based on detection of a matching fingerprint image. Enrollment logic 216 defines processes for obtaining an original image of a person's fingerprint, and for creating and storing a match template (e.g., an enrollment template) that is a data representation of the original image. Authentication logic 218 defines processes for invoking a sample image of a person's fingerprint for identification or verification of a user based on comparison of a data representation of the sample image with one or more stored match templates (e.g., obtained by query logic 210). It is noted that the image registration features described herein can be used by image analyzer 200 within the context of the processes executed by enrollment logic 216 and/or authentication logic 218. As such, the enhanced registration techniques of image analyzer 200 enable images of two different resolutions to be used when creating a match template for user enrollment and when comparing sample images to template images for user authentication.

Image registration system 220 is generally configured to perform processes that enable a direct comparison between two fingerprint images of different and/or unknown resolutions. Prior to comparing two images, for example to detect matching fingerprints during authentication with authentication logic 218, it is often necessary to align two fingerprint images with respect to one another. Partly due to differences in image resolution, and partly due to frequent finger displacement and/or rotation by the user during image acquisitions with different readers 102-110, fingerprint images frequently exist in different coordinate grids. The process of aligning two fingerprint images is generally referred to herein as "image registration." During image registration, data is extracted from an image according to a native coordinate grid of that image (which is at least somewhat relative to the resolution of the image captured with reader 102-110). Image analyzer 200 transforms the data from images existing in different, native coordinate grids into a single or standard coordinate grid. Image registration system 220 illustratively includes configuration component 222, registration component 224, refinement component 226, convergence detector 228, and transformation model generator 230.

Configuration component 222 is generally configured to identify data from two or more fingerprint images. It processes each image to detect identifiable fingerprint features and coordinate positions at which those features exist along a native coordinate grid for a given image. Configuration component 222 generates a set of feature points for each image, each point indicating a feature and a corresponding coordinate position of that feature. In one example, configuration component 222 compares the set of feature points of one image to the set of feature points of another image to identify all similar pairings of features between the images. That is, it identifies a feature point in one image that is close to (e.g., separated by a short distance from) a corresponding feature point in another image. When a pair of features is similarly positioned across two raw images, the pair is identified as possible matching features (e.g., a possible direct match given alignment of the two images).

For each pair of similar features, configuration component 222 generates a weight or other value indicative of a measure of probability that the given pair is a direct match (e.g., a genuine match, as opposed to a spurious match). It generates a larger weight for a pair having a larger probability of being a direct match, and a smaller weight for a pair having a smaller probability of being a direct match (e.g., smaller relative to the larger weight having the higher probability). In one example, the weight of a pair is calculated by determining a distance between the feature points. Weighted values indicating likely genuine matches can be degraded by noise, while weighted values indicating likely spurious matches can be amplified by noise. Configuration component 222 generates a matrix including weights for all pairs of similar features identified between the two images. The matrix is then used by image registration system 220 to define a transformation that more closely aligns the genuine pairs of features across the images.

Registration component 224 is generally configured to register sets of feature points across multiple different images. To align genuine pairs of features across different images, registration component 224 generates a metric that is indicative of closeness of alignment (e.g., how closely are the genuine pairs aligned to one another). The metric of closeness is reduced to a minimum when the images are aligned (e.g., alignment satisfies convergence criterion). In other words, a measure of differences or errors in alignment is reduced to a minimum when the feature points of one set are substantially aligned with the similarly identified feature points of another set using the weighted matrix of similar pairs. Registration component 224 generates the metric by performing an aggregation operation on the weighted pair values of the matrix generated by configuration component 222. The example introduced above where a weight of a similar pair indicates a distance between two points, registration component 224 calculates a weighted sum of the squared distances for all similar pairs in the matrix and generates the metric of closeness based on the weighted sum.

Registration component 224 also defines one or more transformation parameters for transforming the set of features of one image with respect to the set of features of another image. The transformation can include an affine transformation or a wide variety of other transformations that can be performed on the feature sets extracted from the image data. Registration component 224 can define transformation parameters that enable transformations for scale, rotation, translation, mirror, and sheer. To determine optimal transformation parameters that more closely align one feature set to another, registration component 224 accesses a transformation model generated by transformation model generator 230.

Transformation model generator 230 is generally configured to generate a transformation model for a given set of alignment parameters. The transformation model defines a closed-form solution that yields the optimal transformation parameters that minimize the metric generated by registration component 224. Registration component 224 applies the transformation model to the metric to derive the optimal transformation parameters that minimize alignment errors between the first feature set and the second feature set. The transformation parameters are optimal in the sense that they alone yield the smallest value of the metric, for example by providing the optimal alignment of similar features according to a single coordinate grid. The minimization of the metric with the transformation model is iteratively performed, thereby providing a closed-form solution that refines each alignment parameter including, but not limited to, parameters that control image translation, rotation, and scale.

Registration component 224 transforms one of the images with respect to the other image according to the optimal transformation parameters derived through minimizing the metric with the transformation model. Registration component 224 also analyzes the transformed image to detect post-transformation separation for each pair of similar feature points. For instance, registration component 224 detects a distance between the pair of similar feature points and compares that distance to a threshold distance. In one example, it defines the threshold distance based on an original (or previously measured) distance between the pair of similar feature points. If registration component 224 determines that the most recent transformation resulted a pair of similar feature points being separated at a distance that exceeds the threshold distance it identifies the pair for removal. That is, if registration component 224 detects a given pair of similar feature points that is separated at a greater distance due to transformation using the most recently refined transformation parameters, it concludes that the once possible matching pair is actually a spurious pair and discards that pair such that it is no longer considered during additional iterations of registration. Registration component 224 generates an output indicative of the remaining similar pairs based on the separation analysis performed upon each iteration. Thus, the similar pairs that remain after each iteration are increasingly likely to be identified as pair of genuine, matching fingerprint features, as they are more closely aligned with each refinement through the minimization of the metric.

Refinement component 226 is generally configured to control image registration system 220 to iteratively refine the transformation parameters generated by registration component 224 until a criterion is met. It provides an indication to configuration component 222 requesting generation of new weights for the remaining similar pairs of feature points. Refinement component 226 also provides an indication to registration component 224 to refine the metric of closeness according to a new weight matrix, and thereby refine the optimal transformation parameters by iteratively registering the features across the images. To determine whether refinement of image registration is required, refinement component 226 receives an indication of convergence detected by convergence detector 228.

Convergence detector 228 is generally configured to define criteria for detecting convergence upon each iteration of registration. Convergence generally refers to alignment of the matching pairs according to a desired level of certainty, for example when alignment is estimated to have a level of error below a threshold level of error. For instance, convergence detector 228 defines a convergence criterion as a threshold number of similar pairs for discard, a threshold number of matching pairs, or a wide variety of other thresholds that indicate error in alignment of the two feature sets. Convergence detector 228 compares results of the iterative registration process to the convergence criterion to determine whether convergence of the two feature sets is attained. For example, convergence detector 228 detects convergence when the number of similar pairs discarded by registration component 224 is below a threshold number of similar pairs, when the number of remaining pairs (e.g., likely matching pairs) does not exceed a threshold number genuine matching pairs, or when an alignment error is below a threshold error value. Convergence detector 228 can also use a combination of one or more of these criteria among a wide variety of other criteria to detect convergence of the images. If refinement component 226 determines that conference is attained, the similar pairs that have not been discarded are identified as the optimal matching pairs (e.g., are identified as genuine matching pairs of features between the two images). If refinement component 226 determines that convergence is not attained, it controls image registration system 220 to iteratively perform additional transformations until the metric is minimized and the two images are aligned such that convergence detector 228 determines that one or more of the convergence criterion is satisfied.

Figure 3:
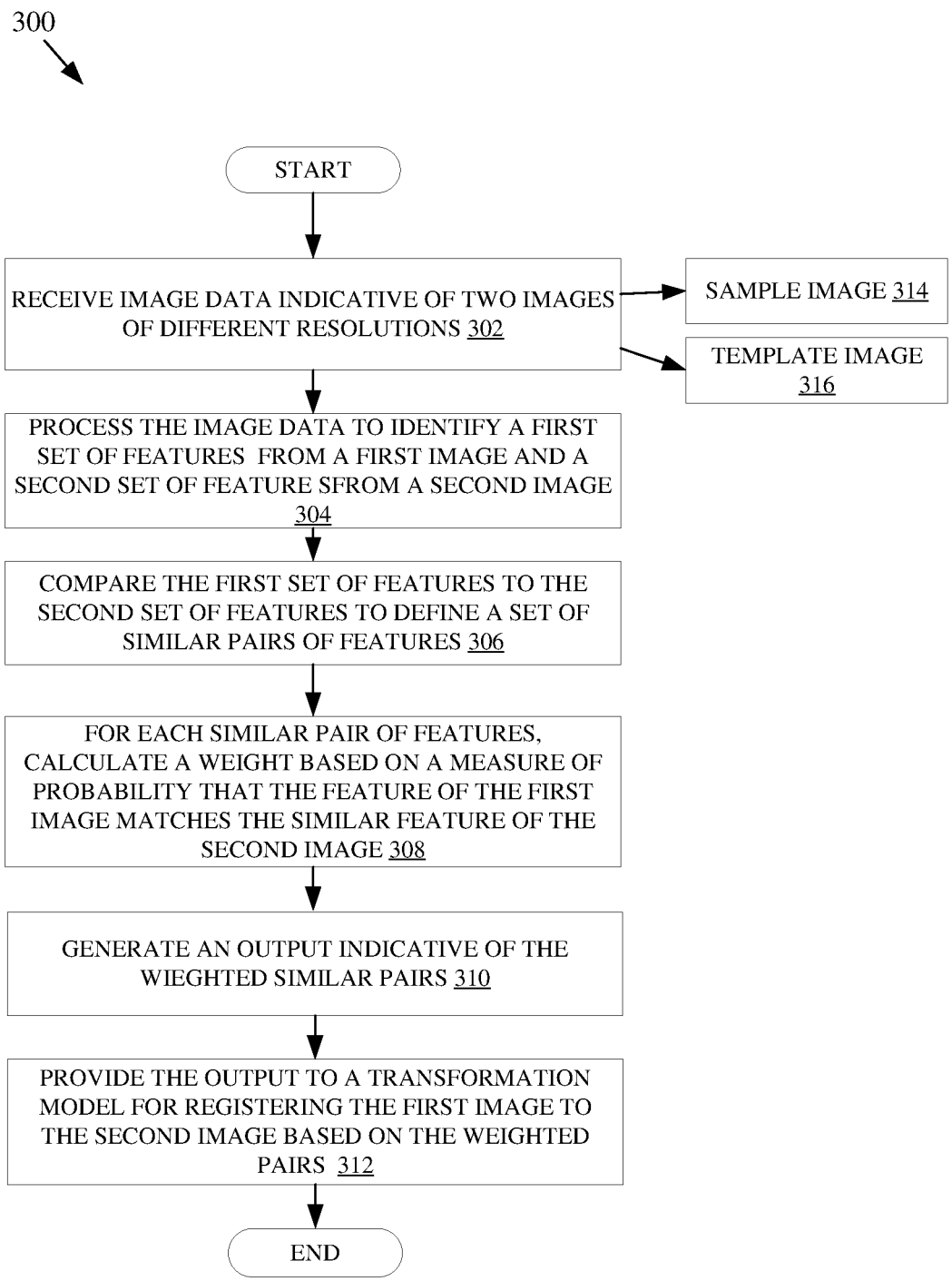
FIG. 3 is a flow diagram of one example operation of identifying possible matching features based on images of different resolutions.

FIG. 3 is a flow diagram of one example operation 300 of identifying possible matching fingerprint features based on images of different resolutions. At block 302, configuration component 222 receives image data indicative of two images of different resolutions. Receiving image data can include receiving image data indicative of a sample image 314, having a first resolution, for example obtained by reader input logic 208. Receiving image data can also include receiving image data indicative of a template image 316, having a second resolution, for example obtained by query logic 210. In one example, sample image 314 is presently captured with reader 102 and template image 316 was previously captured with reader 104.

At block 304, configuration component 222 processes the image data to identify a first set of features from the sample image 314 and a second set of features from the template image 316. For instance, identifying sets of features in accordance with block 304 includes generating a set of coordinate data points for each image, each data point representing a coordinate position of a feature relative to a coordinate grid defined for the respective image. In one example, the image data is unlabeled and configuration component 222 defines a coordinate grid for each image in order to generate a set of feature points at block 304.

At block 306, configuration component 222 compares the first set of features to the second set of features to identify similar pairs of features. Similar pairs of features are generally identified by determining that two identified features are similarly positioned within their local coordinate grids. For instance, configuration component 222 generates a set of similar pairs, each similar pair identifying a feature of sample image 314 and a feature of template image 316, where configuration component 222 determines that the two features not only appear to represent a same physical characteristic of a fingerprint but also appear to be positioned, locally within each image, at a matching position of the fingerprint.

At block 308, configuration component 222 calculates a weight for each similar pair of features identified at block 306. For instance, block 308 includes configuration component 222 calculating a measure of probability that a feature of sample image 314 is a genuine match to a corresponding feature of template image 316 for a given pair. In one example, the weight is calculated by determining a distance between the features in a similar pair.

At block 310, configuration component 222 generates an output indicative of the weighted pairs of similar features. For instance, block 310 includes configuration component 222 generating a matrix that defines the pairs of similar features and the corresponding weights calculated for each pair at block 308.

At block 312, configuration component 222 provides an indication of the output generated at block 310 to a transformation model for registering the first image to the second image according to the weighted values. For instance, configuration component 222 provides an indication of the weighted matrix to registration component 224 in order to generate a transformation parameter with a transformation model.

Figure 4:
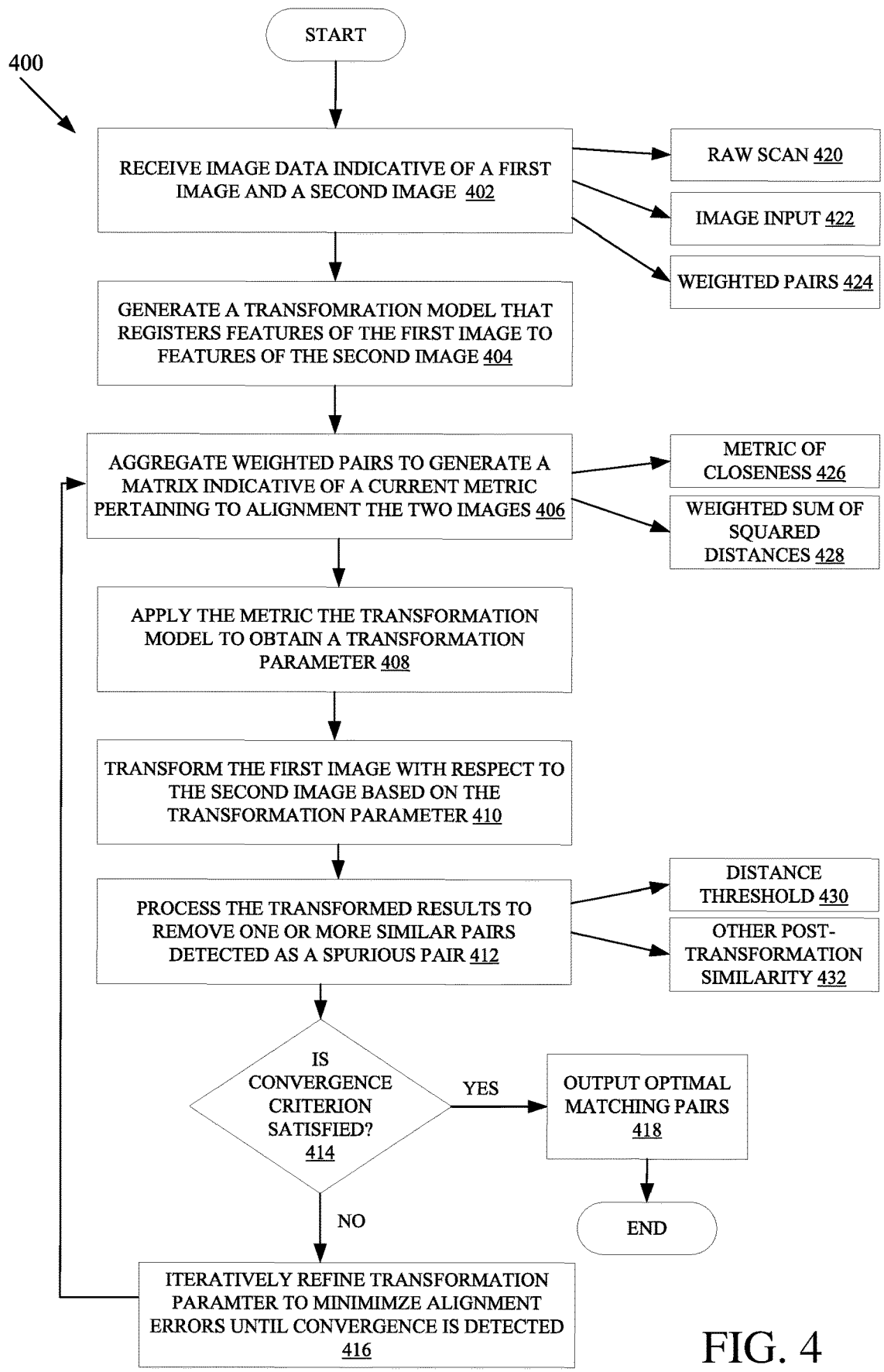
FIG. 4 is a flow diagram of one example operation of using a transformation model to iteratively refine a transformation parameter that, with each iteration, transforms features of one image with respect to features of another image until convergence is attained.

FIG. 4 is a flow diagram of one example operation 400 of using a transformation model to iteratively refine a transformation parameter that, with each iteration, transforms features of one image with respect to features of another image until convergence is attained. At block 402, registration component 224 illustratively receives image data indicative of a first image (e.g. a sample) and a second image (e.g., a template). Receiving image data at block 402 can also or alternatively include receiving a raw scan 420 (e.g., a scan of a previously obtained image or other sensor scan), receiving an image input 422 (e.g., image captured by reader 102-110 or a previously captured image obtained from data store(s) 114), and receiving weighted pairs of similar features 424 (e.g., weighted matrix that is calculated based on probabilities that similar pairs are genuine matching pairs).

For instance, at block 402 registration component 224 receives an indication of the weight matrix generated by configuration component 222.

At block 404, transformation model generator 230 generates a transformation model that facilitates registration of the first image to the second image. Transformation model generator 230 defines a function of the weighted matrix values and the feature that minimizes an error or differences in alignment between the feature sets.

At block 406, registration component 224 aggregates the weights defined by the matrix to generate a metric indicative a current state of alignment of the first image with respect to the second image. In one example, registration component 224 generates a metric of closeness by performing a weighted aggregation of the similar pair values defined by the matrix, which provides a level of difference or error that can be minimized to align genuine matching points. Generating a metric of closeness is to indicated at block 426. In another example, registration component 224 generates a weighted sum of squared distances between the feature points across the similar pairs, as indicated at block 428. In this example, the weighted sum indicated by block 428 represents a degree of alignment error corresponding to detected point separation through iterative image transformations. Minimization of the metric thereby reduces these separation distances until the distances are below some level such that the images are aligned.

At block 408, registration component 224 applies the metric generated at block 406 to the transformation model generated at block 404 to obtain a transformation parameter. Registration component 224, in one example, performs a weighted minimization of the metric with the transformation model to obtain a transformation parameter at block 408. The closed-form solution of the transformation model yields the transformation parameter by enabling registration component 224 to perform a least squares minimization operation on the metric. It is noted that a wide variety of other minimizations can be performed by registration component 224 in accordance with block 408.

At block 410, registration component 224 performs a transformation that transforms the one or more feature sets of image data based on the transformation parameter obtained at block 408. Registration component 224 can apply an affine transformation that shifts, rotates, or scales the feature points of the first image with respect to the similarly positioned feature points of the second image, according to the transformation parameter that, with each transformation further minimizes the metric (e.g., error) by converging the two feature sets across a standard coordinate grid.

At block 412, registration component 224 processes the transformation result to remove one or more similar pairs. Registration component 224 identifies a given pair determined as having an increased likelihood of being a non-genuine pair post-transformation. For instance, it determines whether any pairs are now less closely aligned to one another after each iteration of transformation. In one example, it discards a pair in response to determining that a previously measured distance between two points was less than a current distance measured between the two points after the most recent iteration of transformation with a transformation parameter. Removing pairs that are identified as spurious based on a distance threshold is indicated at block 430. Of course, other post-transformation similarity thresholds can be used as well, as indicated at block 432.

At decision block 414, convergence detector 228 determines whether a convergence criterion is satisfied based on the post-transformation results and the separation analysis performed in accordance with block 412. Block 414 can include convergence detector 228 detecting convergence by using any of the criteria described herein. If, at decision block 414 convergence detector 228 determines that convergence is attained with the most recent iteration, operation 400 illustratively proceeds to block 418. At block 418, registration component 224 identifies the remaining pairs (non-discarded) and outputs an indication of the remaining pairs as the optimal matching pairs for the fingerprint images.

If, at decision block 414 convergence detector instead determines a convergence criterion is not satisfied, operation 400 illustratively proceeds to block 416. At block 416, refinement component 226 controls image registration system 220 to iteratively refine transformation of the first image with respect to the second image to minimize the alignment error (e.g., reduce the metric to a minimum error) until the convergence criterion is satisfied at decision block 414. As such, operation 400 illustratively proceeds to block 406 to perform a next iteration of image registration with respect to the already once-transformed feature sets.

With each iteration of operation 400 (e.g., image registration), configuration component 222 identifies the remaining similar pairs and calculates new weights for each pair. Registration component 224 calculates a new metric based on the new weights, and iteratively applies the new metric to the transformation model to refine the transformation parameter. The refined transformation allows registration component 224 to perform an additional transformation on the feature sets such that the metric is further minimized (e.g., alignment error is reduced as the images are further aligned in a standard coordinate system). For example, the transformation model further reduces a sum of the squared distances between points by applying iterative transformations according to the refined transformation parameter(s).

It is noted that, based on convergence being detected at block 414, image registration system 220 is configured provide the output of the optimal matching pairs to access control component 214. By aligning two images of different resolutions, access control component 214 can perform additional image comparisons to either enroll a user with enrollment logic 216 or authenticate an already enrolled user using authentication logic 218. Because fingerprint images depict small, complex features of fingerprints, the image registration system 220 described herein minimizes alignment errors between images of different resolutions, and thereby enables accurate verification of user identity by detecting a matching fingerprint image through comparison of the aligned images.

One example of image registration system 220 implements the features described herein by defining a series of formulations and instructions that, when executed by processor 202, efficiently register sets of unlabeled image data. Some of these formulations are discussed in further detail below with respect to an example set of image data. It is noted that image registration system 220 can use a wide variety of other formulations and the features of the system are not limited to the examples described herein.

Consider image data indicative of two images, one sample fingerprint image and one template fingerprint image. As discussed above, image analyzer 200 compares features of the sample fingerprint to features of the template fingerprint to detect a match. Prior to detecting a match, image registration system 220 extracts data points from each image and performs iterative transformations on (at least some of) the data points to align similar features across the two images. A set of data points extracted from a given image is generally referred to below as a point set.

Configuration component 222 analyzes each fingerprint image to extract a point set. For example, it extracts a point set U comprising $N_U$ points from the sample fingerprint image, and a point set V comprising $N_V$ points from the template fingerprint image. Point set U therefore indicates each identified feature $N_U$, and point set V indicates each identified feature $N_V$. In one example, configuration component 222 generates a coordinate set that identifies the feature coordinates of each image as $$u_i = (x_i, y_i)^T \in U\ i=1, \ldots, N_U$$

$$v_k = (z_k, t_k)^T \in V\ k=1, \ldots, N_V$$

Image registration system 220 is configured to align point set U with respect to point set V, thereby aligning the features of the two images despite different and/or unknown resolutions and/or scales of the images. Configuration component 222 identifies $N_U/N_V$ similar pairs (e.g., possible matching pairs) and at most $\min\{N_U, N_V\}$ one-to-one similar (e.g., original matching) pairs. Configuration component 222 defines the weight of a similar pair as $m_{ik}$ and is indicative of a probability that a feature $u_i$ and $v_k$ match locally for a given similar pair.

Registration component 224 defines an initial set of transformation parameters for an affine transformation. where a is the shift along the x-direction, b is the shift along the y-direction, s denotes the scale factor, and $\theta\ [0,2\pi]$ is the rotation angle. The scale, s, accounts for the fact that point set U and V have different resolutions. The transformed point set is denoted as U'. One example set of initial transformation parameters includes:

$$u'_i = \begin{pmatrix} x'_i \\ y'_i \end{pmatrix} = \begin{pmatrix} \cos\theta & -\sin\theta \\ \sin\theta & \cos\theta \end{pmatrix} \begin{pmatrix} sx_i \\ sy_i \end{pmatrix} + \begin{pmatrix} a \\ b \end{pmatrix},$$

There are an infinite number of possible sets of alignment parameters $(a,b,s,\theta)$ that could register the point set U to point set V. The inherent ambiguity of alignment is removed, however, by performing a minimization operation for a metric of closeness between the two points sets. Where the minimization is convex, the transformation model can be used to derive an optimal alignment. Registration component 224 therefore applies the affine transformation to transform point set U to point set U'.

Registration component 224 also defines a metric of closeness between the transformed point set U' and the point set V for a given set of alignment parameters $(a,b,s,\theta)$. In one example, it defines the metric as a weighted sum of the squared (Euclidean) distances between similar points in the set:

$$D(U, V; a, b, s, \theta) = \frac{\sum_{i=1}^{N_U} \sum_{k=1}^{N_V} m_{ik} \begin{bmatrix} (sx_i\cos\theta - sy_i\sin\theta + a - z_k)^2 + \\ (sx_i\sin\theta + sy_i\cos\theta + b - t_k)^2 \end{bmatrix}}{\sum_{i=1}^{N_U} \sum_{k=1}^{N_V} m_{ik}} \quad (1)$$

Registration component 224 iteratively refines the transformation parameters $(a,b,s,\theta)$ to minimize $D(U',V;a,b,s,\theta)$. The optimal transformation parameters sought can be expressed as:

$$\left(\hat{a} \ \hat{b} \ \hat{s} \ \hat{\theta}\right) = \min_{a,b,s,\theta} D(U', V; a, b, s, \theta)$$

Generating the weights for the similar pairs of features, $m_{ik}$, drives the registration to the correct alignment. If genuine matching pairs have higher weights than spurious pairs, i.e. the probability that any genuine pair occurs exceeds the probability of occurrence of every spurious pair, then the minimization of Eq. (1) has greater likelihood of yielding the appropriate alignment parameters. For this reason, the computation of the pair weights needs to be as reliable as possible. The probability that sample features i and template features k mutually pair up is defined by configuration component 222 where $S_{Inv,ik}$ and $Q_{ik}$ are each normalized ([0,1]) scores that measure the invariance properties of the pair with respect to other pairs and the quality of the pair at the image level, respectively:

$m_{ik} = S_{Inv,ik} Q_{ik}$,

Specifically, $S_{Inv,ik}$ indicates the likelihood that the angular features of the pair are invariant with respect to the other pairs. Note that since sample and reference fingerprint images are of different resolution, any two matching feature pairs will no longer exhibit radial invariance. $Q_{ik}$ is the product of the quality (or reliability) scores of sample features i and reference features k; if a pair comprises two features of poor quality at the image level, then their quality score will accordingly be low.

Once the weights for every candidate pair of similar features are computed by configuration component 222, they are inputted into Eq. (1). Registration component 224 obtains the optimal alignment parameters by minimizing the closeness metric given by Eq. (1)—that is, taking the partial derivative of Eq. (1) with respect to each alignment parameter, setting each derivative to 0, and then solving the resulting system of equations. Registration component 224 defines the weighted averages of the similar feature sets as:

$$\bar{x} = \frac{\sum_{i=1}^{N_U} \sum_{k=1}^{N_V} m_{ik} x_i}{\sum_{i=1}^{N_U} \sum_{k=1}^{N_V} m_{ik}}$$

$$\bar{y} = \frac{\sum_{i=1}^{N_U} \sum_{k=1}^{N_V} m_{ik} y_i}{\sum_{i=1}^{N_U} \sum_{k=1}^{N_V} m_{ik}}$$

$$\bar{z} = \frac{\sum_{i=1}^{N_U} \sum_{k=1}^{N_V} m_{ik} z_k}{\sum_{i=1}^{N_U} \sum_{k=1}^{N_V} m_{ik}}$$

$$\bar{t} = \frac{\sum_{i=1}^{N_U} \sum_{k=1}^{N_V} m_{ik} t_k}{\sum_{i=1}^{N_U} \sum_{k=1}^{N_V} m_{ik}}$$

Registration component 224 defines the weighted variances of the feature sets as:

$$\sigma_x^2 = \frac{\sum_{i=1}^{N_U} \sum_{k=1}^{N_V} m_{ik} (x_i - \bar{x})^2}{\sum_{i=1}^{N_U} \sum_{k=1}^{N_V} m_{ik}}$$

$$\sigma_y^2 = \frac{\sum_{i=1}^{N_U} \sum_{k=1}^{N_V} m_{ik} (y_i - \bar{y})^2}{\sum_{i=1}^{N_U} \sum_{k=1}^{N_V} m_{ik}}$$

$$\sigma_z^2 = \frac{\sum_{i=1}^{N_U} \sum_{k=1}^{N_V} m_{ik} (z_k - \bar{z})^2}{\sum_{i=1}^{N_U} \sum_{k=1}^{N_V} m_{ik}}$$

$$\sigma_t^2 = \frac{\sum_{i=1}^{N_U} \sum_{k=1}^{N_V} m_{ik} (t_k - \bar{t})^2}{\sum_{i=1}^{N_U} \sum_{k=1}^{N_V} m_{ik}}$$

Registration component 224 also defines the following two terms, where 'cov' denotes the weighted covariance of two variables:

$A = \text{cov}(x,t) - \text{cov}(y,z)$ $B = \text{cov}(x,z) - \text{cov}(y,t)$

Registration component 224 defines the optimal transformation (e.g., alignment) parameters as:

$$\hat{\theta} = \arctan\left(\frac{A}{B}\right)$$

$$\hat{s} = \frac{\sqrt{A^2 + B^2}}{\sigma_x^2 + \sigma_y^2}$$

$$\hat{a} = \bar{z} + \frac{A}{\sigma_x^2 + \sigma_y^2}\bar{y} - \frac{B}{\sigma_x^2 + \sigma_y^2}\bar{x},$$

$$\hat{b} = \bar{t} - \frac{B}{\sigma_x^2 + \sigma_y^2}\bar{y} - \frac{A}{\sigma_x^2 + \sigma_y^2}\bar{x}$$

The optimal transformation (e.g., alignment) parameters are applied to the transformation model by registration component 224 to yield the minimum squared error, defined as:

$$D_{min} = \sigma_z^2 + \sigma_t^2 - \frac{A^2 + B^2}{\sigma_x^2 + \sigma_y^2} \quad (2)$$

Registration component 224 also defines M to denote the queue of all possible minutia pairings between the two fingerprints. Initially, it is noted that M contains $N_U/N_V$ elements. Throughout iterative transformation and alignment, registration component 224 updates the queue by removing spurious pairs.

Registration component 224 uses the estimated optimal alignment parameters to transform (e.g., align) the sample point set with respect to the template point set. After transformation, registration component 224 calculates the squared radial distance between two feature points forming a pair $m_{ik}$ according to:

$$D_{ik}^2 = (\hat{s}x_i \cos \hat{\theta} - \hat{s}y_i \sin \hat{\theta} + \hat{a} - z_k)^2 + (sx_i \sin \hat{\theta} + \hat{s}y_i \cos \hat{\theta} + \hat{b} - t_k)^2$$

Registration component 224 calculates an angle difference between the two features post-transformation. It defines $\alpha_i$ and $\alpha_k$ to denote the feature angles of the $i^{th}$ aligned sample feature and the $k^{th}$ template feature, respectively, and thereby defines the post-transformation alignment angular feature difference as:

$$\Theta_{ik} = \min(|\alpha_i + \hat{\theta} - \alpha_k|, 2\pi - |\alpha_i + \hat{\theta} - \alpha_k|)$$

Registration component 224 detects the total post-alignment displacement between the $i^{th}$ sample feature and the $k^{th}$ template feature using $c_1$ and $c_2$, which are defined as normalization terms that take into account the difference in units between radial and angular displacements using:

$$\Delta_{ik} = \sqrt{c_1 D_{ik}^2 + c_2 \Theta_{ik}^2},$$

Registration component 224 detects a pair of similar features as a genuine match by determining that $\Delta_{ik}$ is small (e.g., below some threshold). It detects a pair as spurious by determining that $\Delta_{ik}$ is large. Registration component 224 thereby identifies and removes spurious pairs post-transformation when the given pair's $\Delta_{ik}$ exceeds some threshold.

To remove spurious pairs, registration component 224 defines T as the n×1 vector of thresholds, where $T_1 > T_2 > \ldots > T_n$. For simplicity, the elements of T are considered to be evenly spaced. Initially, a large threshold $T_1$ is used so to remove outlier spurious pairs (e.g., those having a very large $\Delta_{ik}$). Registration component 224 thereby removes a given pair having $\Delta_{ik} > T_1$ from the queue M. Otherwise, the pair's weight is recalculated, for example using:

$$m_{ik} = 1 - \frac{\Delta_{ik}}{T_1}$$

Upon assessing each pair under the threshold level $T_1$, refinement component 226 counts the number of pairs remaining in queue M. If it determines that no pairs have been removed, then it concludes that $T_1$ is too large of a threshold and controls iteration of registration by proceeding with respect to a new threshold $T_2$.

If refinement component 226 instead determines that at least one pair has been removed, then it provides a request to convergence detector 228 to determine whether convergence is attained. For instance, convergence is reached when no more minutiae pairs are discarded by the smallest threshold in T, when the number of pairs in M does not exceed the maximum number of allowable one-to-one matches (e.g., length(M)<min($N_U$, $N_V$)), when the minimum squared error (Eq. 2) is below some pre-defined value, among a wide variety of other criterions for detecting convergence If convergence detector 228 determines that the convergence criterion is satisfied, then image registration system 220 outputs an indication of the set of remaining feature pairs as the optimal set of matching feature pairs. Otherwise, registration and refinement is iteratively repeated until the convergence criterion is met.

Although the subject matter has been described in language specific to structural features and/or methodological acts, it is to be understood that the subject matter defined in the claims is not necessarily limited to the specific features or acts described above. Rather, the specific features and acts described above are disclosed as example forms of implementing the claim

What is claimed is:

1. A computer-implemented method of registering image data in the context of a biometric security system, comprising:
   receiving an indication of image data;
   detecting a first point set and a second point set, based on the image data;
   generating a metric of closeness between the first point set and the second point set;
   applying the metric of closeness to a transformation model to obtain a transformation parameter;
   transforming the first point set with respect to the second point set, based on the transformation parameter, wherein transforming the first point set with respect to the second point set comprises:
      iteratively aligning the first point set with respect to the second point set according to the transformation parameter;
      for each iteration, determining whether a distance between feature points of a given similar point pair exceeds a threshold distance;
      if so, removing the given similar point pair from the set of similar point pairs; and
      refining the metric of closeness based on new weights calculated for the remaining similar point pairs:
   determining whether transformation of the first point set with respect to the second point set indicates convergence; and
   if so, generating an output indicative of an aligned point set.

2. The computer-implemented method of claim 1, wherein detecting the first and second point sets comprises:
   identifying a first image of a first resolution and a second image of a second resolution, based on the image data; and
   detecting the first point set based on the first image and the second point set based on the second image.

3. The computer-implemented method of claim 2, wherein generating a metric of closeness between the first point set and the second point set comprises:
   defining a set of similar point pairs, each similar point pair identifying a first feature positioned on a coordinate grid with the first resolution and a corresponding second feature similarly positioned on a coordinate grid with the second resolution.

4. The computer-implemented method of claim 3, wherein generating a metric of closeness between the first point set and the second point set comprises:
   assigning a weight to each similar point pair, wherein the weight is calculated by detecting a distance between the first feature and the second feature.

5. The computer-implemented method of claim 4, wherein the metric of closeness is generated by aggregating the weights as a weighted sum of the squared distances.

6. The computer-implemented method of claim 1, wherein applying the metric of closeness to a transformation model to obtain a transformation parameter comprises:
   performing a minimization operation on the metric of closeness.

7. The computer-implemented method of claim 1, wherein applying the metric of closeness to a transformation model to obtain a transformation parameter comprises:

obtaining the transformation parameter as an optimal value that minimizes the metric of closeness using the transformation model.

8. The computer-implemented method of claim 1, wherein determining whether transformation of the first point set with respect to the second point set indicates convergence comprises:

defining a convergence criterion; and determining whether the transformation aligns the first point set with respect to the second point set such that the convergence criterion is met.

9. The computer-implemented method of claim 8, wherein defining a convergence criterion comprises at least one of:

defining a threshold number of similar point pairs for removal, defining a threshold number of similar point pairs in the set of similar point pairs, or defining a threshold alignment error.

10. A computing system, comprising:

an image acquisition component that obtains a first image and a second image;

an image configuration component that:

identifies a set of similar point pairs, each point pair having a first point from the first image and a second point from the second image, and calculates a weight value for each point pair; and an image registration component that:

defines a metric of alignment by aggregating the weighted values;

applies a transformation model to the metric of alignment to obtain a transformation parameter, transforms the first image with respect to the second image, based on the transformation parameter, iteratively removes a given point pair from the set, and refines the transformation parameter with the transformation model based on new weight values calculated for the remaining similar point pairs until convergence is detected.

11. The computing system of claim 10, further comprising:

an access control component that regulates user access in the context of a biometric security system based on an indication of convergence being detected.

12. The computing system of claim 10, wherein the image registration component iteratively applies the transformation model such that each iteration of transformation according to the refined transformation parameter aligns the remaining similar point pairs.

13. The computing system of claim 12, wherein the image registration component iteratively aligns the remaining similar point pairs until a convergence criterion is met.

14. The computing system of claim 13, wherein the metric of alignment indicates a weighted aggregation of squared distances between the similar point pairs, and wherein the image registration component:

identifies the given point pair for removal by determining that a distance between features of the given point pair exceeds a threshold distance; and aligns the remaining similar point pairs by reducing the weighted aggregation of squared distances, with each iterative application of the transformation model, until the convergence criterion is met.

15. A computer-implemented method of regulating user access in the context of a biometric security system, comprising:

receiving image data indicative of a first image and a second image;

processing the image data to identify pairs of similar features, each pair identifying a feature of the first image and a corresponding feature of the second image;

calculating a set of weighted values, each weighted value indicating a distance between the feature of the first image with respect to the corresponding feature of the second image for a given pair of similar features;

generating a transformation model that defines a measure of similarity between the first image and the second image based on the set of weighted values;

aggregating the set of weighted values with the transformation model to define the measure of similarity, wherein the aggregated set of weighted values is indicative of a weighted sum of squared distances between the pairs of similar features;

iteratively transforming the first image with respect to the second image according to a transformation parameter obtained with the transformation model, wherein the transformation model refines the transformation parameter with each iteration to minimize the measure of similarity;

determining, with each iteration, whether a convergence criterion is met;

if so, regulating user access based on the convergence criterion being met; and with each iteration, determining whether a distance between a particular pair of similar features exceeds a threshold distance;

if so, removing the particular pair of similar features; and calculating a new set of weighted values for the remaining pairs of similar features.

16. The computer-implemented method of claim 15, wherein the transformation model refines the measure of similarity based on the new set of weighted values, and wherein iteratively transforming the first image with respect to the second image comprises:

with each iteration, reducing distances between the remaining pairs of similar features by aligning the first image with respect to the second image according to the refined transformation parameter.

* * * * *